United States Patent
Asbrand et al.

[19]

[11] Patent Number: 6,003,427

[45] Date of Patent: Dec. 21, 1999

[54] DAMPER VALVE ARRANGEMENT

[75] Inventors: Ulrich Asbrand, Remshalden; Aydogan Cakmaz, Stuttgart; Horst Gutscher, Leonberg; Wolfgang Möckel, Korntal-Münchingen, all of Germany

[73] Assignees: DaimlerChrysler AG, Stuttgart; Hogo Benzing GmbH & Co. KG, Korntal-Muenchingen, both of Germany

[21] Appl. No.: 08/971,221

[22] Filed: Nov. 14, 1997

[30] Foreign Application Priority Data

Nov. 14, 1996 [DE] Germany ............................ 196 47 130

[51] Int. Cl.⁶ ..................... F15B 11/042; F15B 11/044
[52] U.S. Cl. ................. 91/447; 60/469; 137/599; 137/493.9
[58] Field of Search ................... 60/469; 91/29, 91/31, 447, 452; 137/493.8, 493.9, 513.5, 513.7, 599

[56] References Cited

U.S. PATENT DOCUMENTS

| | | | |
|---|---|---|---|
| 428,843 | 5/1890 | Jamison | 137/599 |
| 3,592,223 | 7/1971 | Reese | 137/493.8 |
| 4,262,695 | 4/1981 | Iizumi | 137/599 |
| 5,584,226 | 12/1996 | Roemer et al. | 91/447 |

FOREIGN PATENT DOCUMENTS

| | | |
|---|---|---|
| 0 420 610 | 4/1991 | European Pat. Off. . |
| 1650440 | 8/1970 | Germany ............................ 137/599 |
| 29 27 039 | 1/1981 | Germany . |
| 40 29 156 | 4/1991 | Germany . |
| 41 06 310 | 8/1991 | Germany . |
| 43 23 179 | 11/1994 | Germany . |
| 44 23 658 | 1/1996 | Germany . |
| 91773 | 6/1987 | Japan . |
| 109478 | 7/1989 | Japan . |

*Primary Examiner*—F. Daniel Lopez
*Attorney, Agent, or Firm*—Evenson, McKeown, Edwards & Lenahan, P.L.L.C.

[57] ABSTRACT

The invention relates to a damper valve arrangement, which can be combined with a servomotor of a hydraulic power steering system to form a steering damper. For calibration purposes, the damper valve arrangement has a bypass duct with a calibratable throttling resistance.

10 Claims, 3 Drawing Sheets

DAMPER VALVE ARRANGEMENT

BACKGROUND AND SUMMARY OF THE INVENTION

This application claims the priority of German application 196 47 130.3, the disclosure of which is expressly incorporated by reference herein.

The invention relates to a damper valve arrangement, which is suitable for a hydraulic power steering system, the servomotor of which is designed as a hydrostatic motor unit or as a hydraulic displacer unit and also acts as a steering damper, due the fact that at least one damper valve arrangement is provided in hydraulic lines between servomotor and servovalve, having at least one flow path which is controlled or throttled by damper valve elements.

Modern motor vehicles are regularly equipped with power steering, which at least in the case of passenger cars generally operates using auxiliary hydraulic power, in such a manner that the forces which the driver has to apply when steering the vehicle are always sufficiently low.

In order as far as possible to avoid or suppress fluctuations in the steering system, virtually all vehicle steering systems have a steering damper.

In this connection, it is known from German patent document DE-A 40 29 156 to enable a double-acting piston-cylinder unit, which serves as the servomotor, also to act as the steering damper, by providing damper valve arrangements in the lines between the piston-cylinder unit and the servovalve which is used to control the latter and via which the piston-cylinder unit can be connected in a controllable manner to a hydraulic pressure source and a relatively unpressurized hydraulic reservoir.

A fundamentally similar arrangement is described in German patent document DE-A 41 06 310.

It is known from German patent document DE-A 29 27 039 (=Great Britain patent document GB 2051714 A) to arrange in each case one non-return valve, which opens in the direction towards the respective piston working chamber and is provided with a throttle through-bore, at the cylinder-side connections of the lines which connect the servovalve to the double-acting piston-cylinder unit of a power steering system, the valve housing of which non-return valve may be formed by a screw which serves to fasten the respective line to the cylinder.

In order to simplify the damper valve arrangement, German patent document DE 43 23 179 A1 envisages providing the damper valves on a valve support part in the form of a perforated disc, the holes of which, through which the hydraulic medium passes, can be controlled by means of small valve plates held on the end side of the valve support part by bolts and/or by means of spring-mounted valve plates. There may be provision here for clamping the valve support part in the form of a perforated disc, in the manner of a spacer ring or a spacer disc, between a bearing surface of a connection stub arranged on the housing of the servo valve or of the servomotor and a mating bearing surface of the connection part, which can be connected to the connection stub, of the hydraulic line.

Instead of this, it is also possible to hold the valve support part captively in the connection stub or in the connection part, as is illustrated, for example, in German patent document DE 44 23 658 A1.

The power steering systems described above are extremely advantageous, owing to the dual function of the servomotor, which firstly generates a servoforce and secondly serves as a steering damper. Nevertheless, such designs remain extremely expensive, because the servomotor, which can be driven in two directions, must be provided on both sides with identically acting damper valve arrangements, in order to achieve an identical damping action in both directions of movement. Accordingly, it is always necessary for damper valve arrangements which are matched to one another in pairs to be present. However, since there are inevitable tolerances which result from the production of the damper valve arrangements, it is always necessary to hunt out pairs of damper valve arrangements with identical damping actions.

An object of the invention is to provide damper valves with extremely precisely defined characteristics.

This and other objects have been achieved according to the present invention by providing a damper valve arrangement, which is suitable for a hydraulic power steering system having a servomotor which is designed as a hydrostatic motor or displacer unit and also acts as a steering damper, said damper valve arrangement being provided in a hydraulic line between the servomotor and a servovalve, said damper valve arrangement comprising at least one flow path which is controlled or throttled by damper valve elements, and a bypass duct with a calibratable throttling resistance arranged parallel to the flow path.

The damper valve arrangement of the present invention utilizes a bypass duct with a calibratable throttling resistance parallel to the flow path.

The invention is based on the general idea of compensating for production tolerances in the damper valve arrangement by providing the ability to calibrate the throttling resistance. The fact that, according to the invention, the bypass duct with calibratable throttling resistance now provides a throttling path which can still be adjusted even after production of the damper valve arrangement means that the desired throttling effect of the damper valve arrangement can be defined extremely accurately, so that virtually any damper valve arrangements can be combined to form pairs with virtually identical parameters.

The invention takes into account the fact that the throttling resistance of a flow path changes to the extent of about the 5th power of the diameter of the flow path, and consequently even slight production tolerances lead to very different flow resistances. The possibility of calibrating the throttling resistance of the bypass duct allows this unavoidable effect to be compensated for.

According to a preferred embodiment of the invention, the damper valve arrangement has a support part in the form of a perforated disc and having a central axial peg, which, on the one hand, serves to hold spring-loaded valve plates and/or small valve-spring plates for controlling the flow paths formed by the holes in the perforated disc and, on the other hand, has an axial duct, which forms the bypass duct, passing through it, at one end of which duct is arranged a throttle element which leaves open a calibratable gap.

In a particularly preferred manner, it is provided for the support part to be arranged coaxially with respect to the screw axis and captively in a connection part, which has a cup-shaped interior, for holding a hydraulic line and divides up the interior between the open end and the closed end of the connection part, an axially adjustable pin, which is arranged coaxially with the bypass duct, being arranged as a throttling element at the closed end of the connection part, so that the throttling action can easily be calibrated.

As an alternative, it is also possible and advantageous to replace the abovementioned axially adjustable pin with a mandrel-like extension arranged fixedly on the connection part and to arrange the pin containing the bypass duct in an axially adjustable manner on the support part.

Other objects, advantages and novel features of the present invention will become apparent from the following detailed description of the invention when considered in conjunction with the accompanying drawings.

DETAILED DESCRIPTION OF THE DRAWINGS

Figure 1:
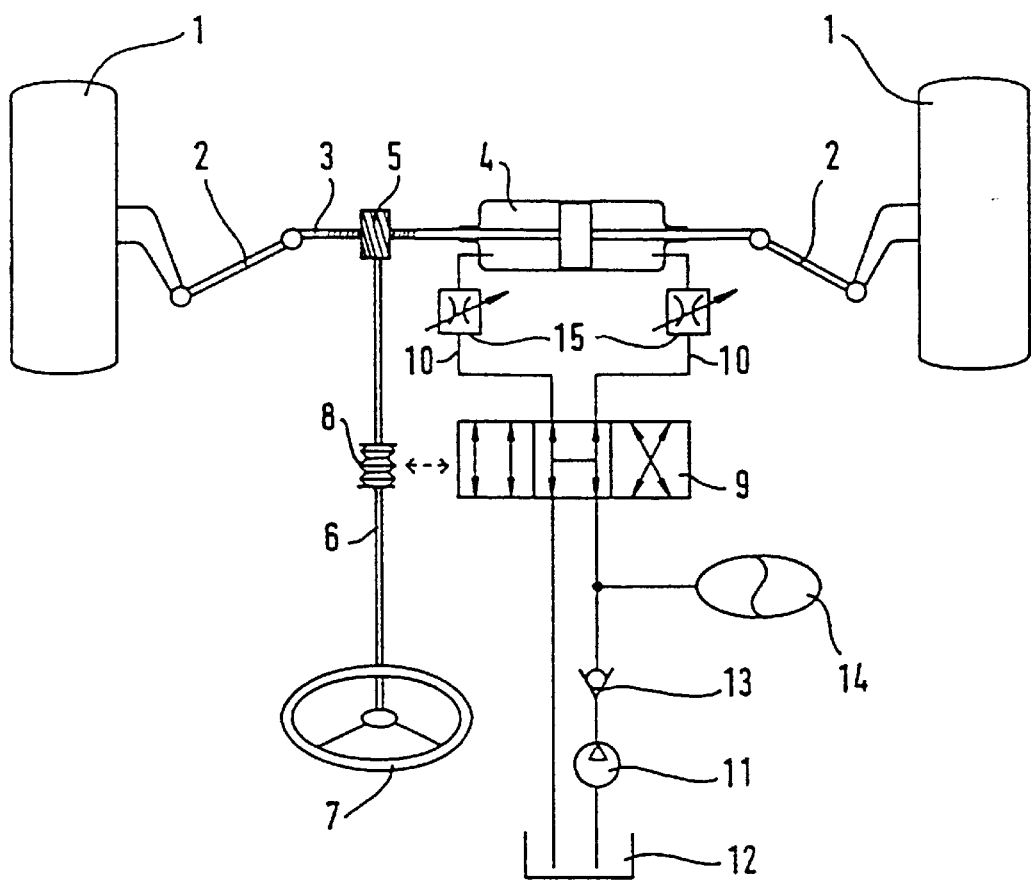
FIG. 1 shows a diagrammatic illustration, in the form of a circuit diagram, of a hydraulic power steering system with damper valves on the servomotor.

In accordance with FIG. 1, a motor vehicle, which is not shown in more detail, has front vehicle-steering wheels 1, which in the example illustrated are connected via steering tie rods 2 to a steering rack 3, which merges coaxially into the piston rod of a double-acting piston-cylinder unit 4 arranged as a servomotor or is connected to this piston rod.

The steering rack 3 meshes with a pinion 5, which is connected in drive terms to a steering wheel 7 via a steering column 6. A torsionally elastic element 8 is arranged in the steering column 6, so that a limited relative rotation is possible between pinion 5 and steering wheel 7, the extent of which rotation is dependent on the forces and moments transmitted between pinion 5 and steering wheel 7.

This relative rotation controls a servovalve 9, which is connected, via hydraulic lines 10, to the two chambers of the piston-cylinder unit 4 and, on the other hand, to the delivery side of a hydraulic pump 11 and a relatively unpressurized hydraulic reservoir 12, to which the suction side of the pump 11 is connected.

In the illustrated central position of the servovalve 9, the two chambers of the piston-cylinder unit 4 are connected to one another and to the reservoir 12. There may moreover be a connection with the delivery side of the pump 11, which can then run continuously.

As an alternative, it is also possible, in the central position of the servovalve 9, for the valve connection to the delivery side of the pump to be blocked, the pump in this case being able to charge a pressure accumulator 14 via a non-return valve 13 and being controlled as a function of the boost pressure and/or switched off at high boost pressure.

As soon as forces or torques are active between pinion 5 and steering wheel 7, the servovalve 9 is moved out of its central position in one direction or the other, with the result that a more or less great pressure difference is generated in one direction or the other between the motor lines 12, and hence a more or less great servoforce of the piston-cylinder unit 4 is generated in one direction or the other, and the force which is to be applied to the steering wheel 7 in order to execute a steering maneuver is reduced to a corresponding extent.

In the steering system according to the invention, the piston-cylinder unit 4, which serves as the servomotor, also assumes the function of a steering damper for damping rapid changes in steering angle of the vehicle-steering wheels 1.

For this purpose, damper valves 15, which in FIG. 1 are depicted as restrictors, are arranged at the connections of the lines 10 to the piston-cylinder unit 4. The throttling resistance of the damper valves 15 damps rapid movements of the piston, of the piston-cylinder unit 4, and, accordingly, damps rapid steering adjustments in the vehicle-steering wheels 1. According to the invention, the damping actions of the damper valves 15 can be calibrated, as explained further below and indicated in FIG. 1 by adjustable restrictors.

Figure 2:
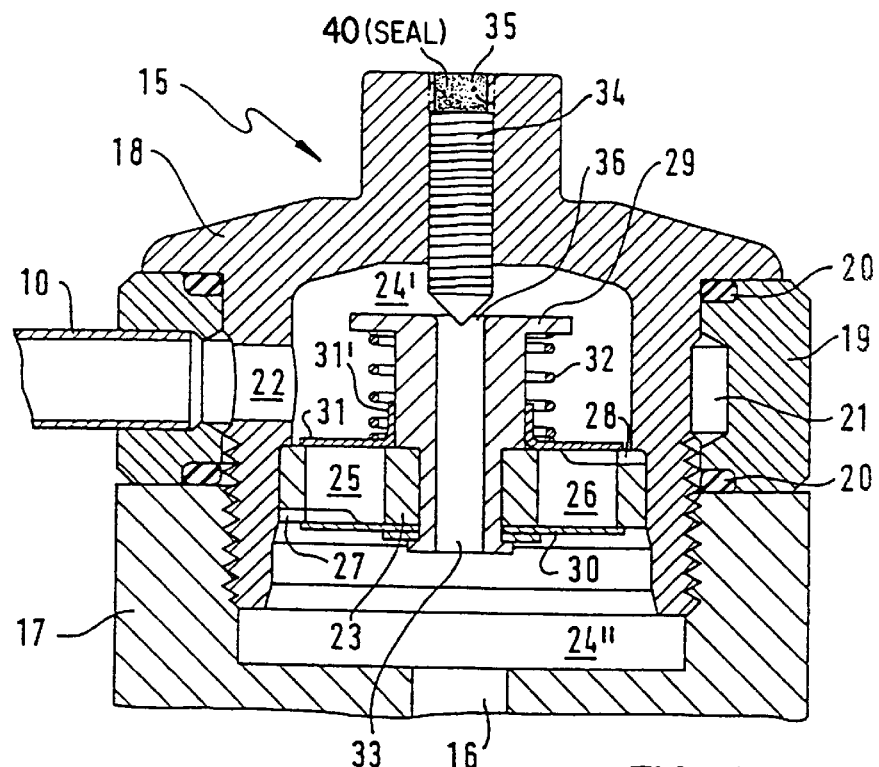
FIG. 2 shows a section through a first embodiment of a damper valve arrangement according to a preferred embodiment of the present invention.

FIG. 2 now shows a first embodiment of a damper valve arrangement 15.

Each chamber on the piston-cylinder unit 4 is provided with a connection port 16, which is arranged inside an internally threaded part 17, coaxially with the axis of the thread. A cap-shaped connection part 18, with an external screw head arranged thereon, can be rotated into the internally threaded part 17. A holding ring 19, which is fixedly connected to the motor line 10, is clamped axially in between mutually opposite flange faces on the internally threaded part 17, on the one hand, and on the connection part 18, on the other hand. The gaps between the end sides of the holding ring 19 and the facing flange faces of internally threaded part 17 and connection part 18 are closed off in a pressure-tight manner by sealing rings 20 on the holding ring 19.

On its inner circumference, the holding ring 19 has a duct 21, which is formed in the manner of an annular groove and is in communication, on the one hand, with the hydraulic line 10 and, on the other hand, with one or more radial bores 22 in the connection part 18, thus producing a connection between the motor line and the interior of the connection part 18.

A circular disc-shaped support part 23 is held fixedly and captively inside the connection part 18, this support part, inside the connection part 18, separating a chamber 24' which adjoins the radial bore or radial bores 22 from a chamber 24" which adjoins the connection port 16.

The support part 23 has axial bores 25 and 26, the axial bores 25 emerging in a recess 27, which is open towards the chamber 24", on the lower end side of the disc-shaped support part 23 and the axial bores 26 emerging in a similar recess 28 on the upper end side, in FIG. 2, of the support part 23.

A bolt or central axial member 29 is held in a central opening in the support part 23, which bolt, on one end side of the support part 23—in the example shown in FIG. 2 on the end side which faces the connection port 16—holds circular disc-shaped spring plates 30 and, on the other end side of the support part 23, is designed as an axial guide for an annular disc 31.

The spring plates 30 are dimensioned in such a manner that they at least substantially cover the axial bores 26 in the support part 23 and leave clear larger areas of the recesses 27 associated with the axial bores 25. The annular disc 31 is dimensioned in such a manner that it is able to cover the axial bores 25 and leaves open at least areas of the recesses 28 associated with the axial bores 26.

On its internal circumferential edge, the annular disc 31 has a sleeve-shaped (i.e. cylindrical-shaped) extension 31', which surrounds the bolt 29 with a slight radial clearance. A helical compression spring 32, which clamps the annular disc 31 against the support part 23, is clamped in between the annular disc 31 and a flange arranged at the free end of the bolt 29.

An axial duct 33 passes through the bolt 29; a conical tip of an adjustment screw 34, which is arranged coaxially with the axial duct 33 and is held such that it can be adjusted by screwing in a threaded bore 35 in the cap-shaped base of the connection part 18, projects into the upper end (in FIG. 2) of this axial duct. An annular gap 36, the cross-section of which can be calibrated by adjusting the adjustment screw 34, remains between the conical tip of the adjustment screw 34 and the edge of the facing end opening of the axial duct 33.

After calibration has been carried out, the adjustment screw 34 is fixed permanently in the threaded bore 35, for example by means of an adhesive introduced into the thread of the threaded bore 35 or of the adjustment screw 34, which adhesive cures, thus sealing the adjustment screw 34 in the threaded bore 35.

Figure 3:
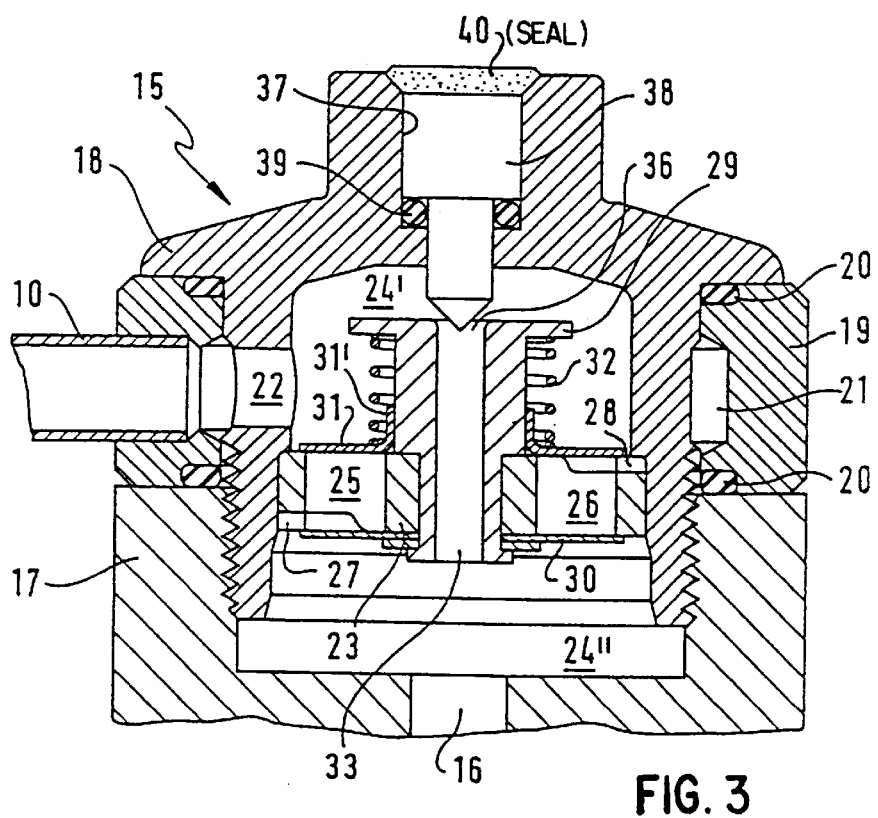
FIG. 3 shows a section through a modified embodiment.

The embodiment illustrated in FIG. 3 differs from the embodiment in accordance with FIG. 2 essentially by the fact that a stepped bore 37 is arranged in the cap-shaped base of the connection part 18, coaxially with the axial duct 33. This bore 37 accommodates a suitable press pin 38, which has an annular step between its lower end (in FIG. 3) having the smaller diameter and its upper end. Inside an annular space formed by the annular step of the bore 37 and the annular step of the press pin 38, there is arranged a sealing ring 39, which only partially fills the said annular space, so that the press pin 38 can still be advanced downwards, reducing the size of the annular space.

The thicker end of the press pin 38 is held in the upper region, of larger diameter, of the bore 37 by a press fit.

The annular gap 36 which remains between the edge of the upper end opening of the axial duct 33 and the conical tip of the press pin 38 can be calibrated by moving the press pin 38 axially to a greater or lesser extent into the bore 37, in the direction of the bolt 29.

As soon as the desired position of the press pin 38 has been reached, the upper end (in FIG. 3) of the press pin 38 is covered by a seal 40.

An identical sealing can also be carried out in the embodiment of FIG. 2.

The spring plates 30 and the annular disc 31 interact with the axial bores 25 and 26 and the recesses 27 and 28 as throttles.

In the event of a hydraulic flow from chamber 24' to chamber 24", the hydraulic medium then flows through a small free space past the outer edge of the annular disc 31, through the recess 28 and the axial bores 26, and lifts the spring plates 30 off the underside of the support part. In the event of an opposite direction of flow, the hydraulic medium flows past the outer edge of the spring plates 30, through the recesses 27 and the axial bores 25, and, in the process, raises the annular disc 31, counter to the force of the helical compression spring 32. In both directions of flow, the flow is restricted and thus the movement of the piston of the piston-cylinder unit 4 in FIG. 1 is damped.

Moreover, the hydraulic medium passes through the bypass duct 33 in both directions of flow.

The throttling resistances which arise overall in both directions of flow are fine-tuned according to the invention by the axial position of the adjustment screws 34 in FIG. 2 or of the press pin 38 in FIG. 3.

Figure 4:
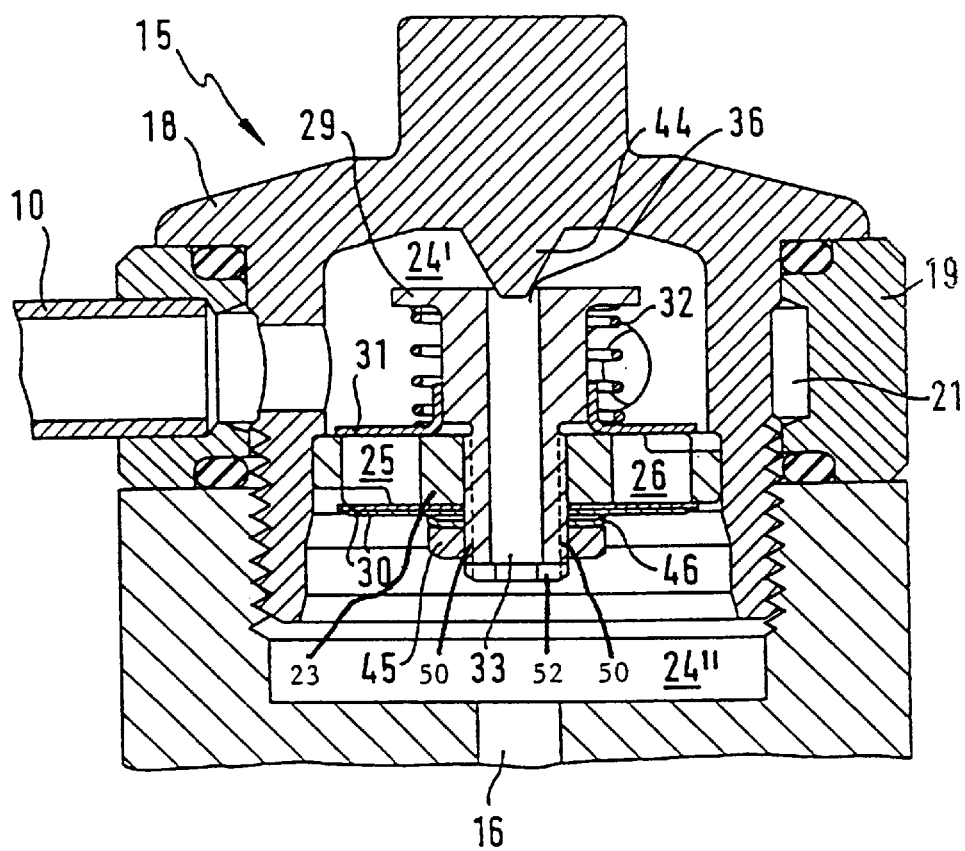
FIG. 4 shows a section through a further embodiment.

The embodiment depicted in FIG. 4 differs from the embodiments shown in FIGS. 2 and 3 primarily in that a mandrel-like extension 44, which is arranged fixedly or is formed integrally on the connection part 18, is arranged on the connection part 18, instead of the axially adjustable elements 34 and 38 provided in accordance with FIGS. 2 and 3, this mandrel-like extension interacting in a restrictive manner with the facing opening of the bypass duct 33. In order to adjust the annular gap 36 between the edge of the said opening of the bypass duct 33 and the mandrel-like extension 44, the bolt 29 is provided with an externally threaded section on its lower region (shown as broken line 5o in FIG. 4). The support part 23 has a corresponding central bore with an internal screw thread (shown as broken line 50 in FIG. 4), so that the bolt 29 is held on the support part 23 in such a manner that it can be adjusted by screwing, and is thus axially adjustable. In order to be able to perform the screw adjustment, the lower end side (in FIG. 4) of the bolt 29 is provided with transverse slots 52 or the like in order to be able to attach a screwdriver or corresponding tool.

The respectively set position of the bolt 29 is secured by means of a lock nut 45 which can be screwed onto the threaded section 50 of the bolt 29 and can be clamped against the underside of the support part 23 or against a spring ring 46, which is arranged on the bolt 29, between the lock nut 45 and the underside of the support part 23.

The lock nut 45 and/or the spring ring 46 simultaneously serve to hold the spring plate or spring plates 30 arranged on the underside of the support part 23.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hydraulic power steering system comprising:
   a servomotor which is designed as a hydrostatic motor and also acts as a steering damper, and
   a damper valve arrangement provided in a hydraulic line between the servomotor and a servovalve, said damper valve arrangement comprising at least one flow path which is throttled by damper valve elements, and a bypass duct with means for calibrating a throttling resistance arranged parallel to the flow path.

2. Damper valve arrangement to be arranged in a hydraulic line between a servomotor and a servovalve in a hydraulic power steering system, said damper valve arrangement comprising:
   a support part in the form of a perforated disc defining a plurality of holes,
   spring-loaded valve plates and/or valve-spring plates being supported on a central axial member adjacent said support part to at least partially cover the holes such that said holes define a throttled flow path,
   said central axial member supported on said support part,
   said central axial member defining an axial duct acting as a bypass duct parallel to said throttled flow path, and
   a throttle element arranged at one end of said duct such that a calibratable gap is defined between said throttle element and said end of said duct.

3. Damper valve arrangement according to claim 2, wherein the support part is arranged coaxially with respect to an axis defined by said throttle element and is held in a connection part, said connection part being communicated with a hydraulic line, said connection part defining a cup-shaped interior, said support part being arranged in the interior between an open end and a closed end of the connection part, said throttle element being an axially adjustable pin, said pin being arranged coaxially with the bypass duct, at the closed end of the connection part.

4. Damper valve arrangement according to claim 3, wherein the pin is arranged as an adjustment screw in a threaded bore of the connection part.

5. Damper valve arrangement according to claim 3, wherein the pin is designed as a press pin and is held fixedly in a bore in the connection part by a press fit.

6. Damper valve arrangement according to claim 4, wherein the pin is secured by an adhesive forming a seal.

7. Damper valve arrangement according to claim 4, wherein the pin is covered by a seal.

8. Damper valve arrangement according to claim 5, wherein the pin is covered by a seal.

9. Damper valve arrangement according to claim 8, wherein the central axial member is axially adjustable via an external threaded section thereof engaged with an internally threaded bore in the support part.

10. Damper valve arrangement according to claim 9, wherein a lock nut is threadedly engaged with the external threaded section of the central axial member in order to fix the central axial member to the support part in a non-rotatable manner, and also to hold at least one spring plate and/or a spring ring.

* * * * *